United States Patent
Gupta

(10) Patent No.: US 10,756,892 B2
(45) Date of Patent: Aug. 25, 2020

(54) PROTECTING DATA IN A MULTI-TENANT CLOUD-BASED SYSTEM

(71) Applicant: SAP SE, Walldorf (DE)

(72) Inventor: Vipul Gupta, Bangalore (IN)

(73) Assignee: SAP SE, Walldorf (DE)

( * ) Notice: Subject to any disclaimer, the term of this patent is extended or adjusted under 35 U.S.C. 154(b) by 87 days.

(21) Appl. No.: 15/428,954

(22) Filed: Feb. 9, 2017

(65) Prior Publication Data

US 2018/0227122 A1    Aug. 9, 2018

(51) Int. Cl.
*H04L 29/06* (2006.01)
*H04L 9/08* (2006.01)
*G06F 21/00* (2013.01)
*G06F 21/62* (2013.01)

(52) U.S. Cl.
CPC ............ *H04L 9/0869* (2013.01); *G06F 21/00* (2013.01); *G06F 21/6209* (2013.01)

(58) Field of Classification Search
CPC ..... H04L 9/0869; G06F 21/6209; G06F 21/00
See application file for complete search history.

(56) References Cited

U.S. PATENT DOCUMENTS

| | | | | |
|---|---|---|---|---|
| 4,591,660 A * | 5/1986 | Scordo | ................ | H04L 9/0625 380/29 |
| 5,917,835 A * | 6/1999 | Barrett | .................. | H04L 69/04 369/93 |
| 6,445,797 B1 * | 9/2002 | McGough | ............. | H04L 9/0631 380/262 |
| 6,609,654 B1 * | 8/2003 | Anderson | ........ | G06K 19/06196 235/379 |
| 7,587,614 B1 * | 9/2009 | Langhammer | ........ | H04L 9/0625 380/37 |
| 7,590,860 B2 * | 9/2009 | Leporini | ................. | G06F 21/10 380/200 |
| 7,925,013 B1 * | 4/2011 | Washington | ............ | G06F 21/72 380/239 |
| 2004/0086116 A1 * | 5/2004 | Rarick | .................. | H04L 9/0625 380/37 |
| 2005/0138374 A1 * | 6/2005 | Zheng | ................... | H04L 9/0894 713/166 |
| 2006/0034456 A1 * | 2/2006 | McGough | ............. | H04L 9/0844 380/30 |
| 2006/0153373 A1 * | 7/2006 | Mukherjee | ............. | H04H 60/15 380/42 |
| 2007/0140482 A1 * | 6/2007 | Ploog | ...................... | G06F 21/85 380/44 |

(Continued)

*Primary Examiner* — Chau Le
*Assistant Examiner* — Hany S. Gadalla
(74) *Attorney, Agent, or Firm* — Mintz Levin Cohn Ferris Glovsky and Popeo, P.C.

(57) ABSTRACT

Methods and apparatus, including computer program products, are provided for securing data in a multi-tenant cloud-based system. In some implementations, there is provided a method. The method may include requesting access to at least one encrypted data element; obtaining, in response to the requesting, a long bit stream assigned to a client associated with the requested access; generating a key to decrypt the at least one data element, the key generated by selecting, based on a permutation, portions of the long bit stream; and decrypting, based on the generated key, the at least one data element. Related systems, methods, and articles of manufacture are also disclosed.

17 Claims, 5 Drawing Sheets

(56) References Cited

U.S. PATENT DOCUMENTS

| | | | |
|---|---|---|---|
| 2010/0142705 A1* | 6/2010 | Reffe | H04L 9/0643 |
| | | | 380/46 |
| 2011/0185023 A1* | 7/2011 | Jin | G06Q 10/06 |
| | | | 709/206 |
| 2014/0310779 A1* | 10/2014 | Lof | H04L 63/0421 |
| | | | 726/4 |

* cited by examiner

PROTECTING DATA IN A MULTI-TENANT CLOUD-BASED SYSTEM

FIELD

The subject matter described herein generally relates to securing data.

BACKGROUND

A multi-tenant system refers to a cloud-based system including one or more servers accessed via for example the Internet. The cloud-based system may provide software as a service (SAAS). Each of the tenants can each access a software service, execute the service, store data, and/or retrieve data at the cloud-based system. For example, a user at company X may run a database application provided by the cloud-based system, while another user at another company can independently execute its own corresponding database application provided by the cloud-based system.

SUMMARY

In some implementations, methods and apparatus, including computer program products, are provided for securing data elements in a system such as a multi-tenant system.

In some implementations, there is provided a method. The method may include requesting access to at least one encrypted data element; obtaining, in response to the requesting, a long bit stream assigned to a client associated with the requested access; generating a key to decrypt the at least one data element, the key generated by selecting, based on a permutation, portions of the long bit stream; and decrypting, based on the generated key, the at least one data element.

In some variations, one or more of the features disclosed herein including the following features can optionally be included in any feasible combination. The permutation may be associated with the at least one data element being decrypted. The permutation may identify which bits in the long bit stream are selected for the key. The permutation may be generated randomly. The permutation may be assigned to the client and the at least one data element to enable access to the at least one data element. The permutation may be stored in a secure storage. The at least one data element may include a row and/or a column in a database.

It is to be understood that both the foregoing general description and the following detailed description are exemplary and explanatory only and are not restrictive. Further features and/or variations may be provided in addition to those set forth herein. For example, the implementations described herein may be directed to various combinations and sub combinations of the disclosed features and/or combinations and sub combinations of several further features disclosed below in the detailed description.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the subject matter disclosed herein. In the drawings.

FIG. 1B illustrates an example of a long key assigned to a client-user and examples of derived keys generated based on permutations, in accordance with some example implementations;

FIG. 2 shows permutations mapped to index locations of a long bit stream, in accordance with some example implementations;

DETAILED DESCRIPTION

Figure 1A:
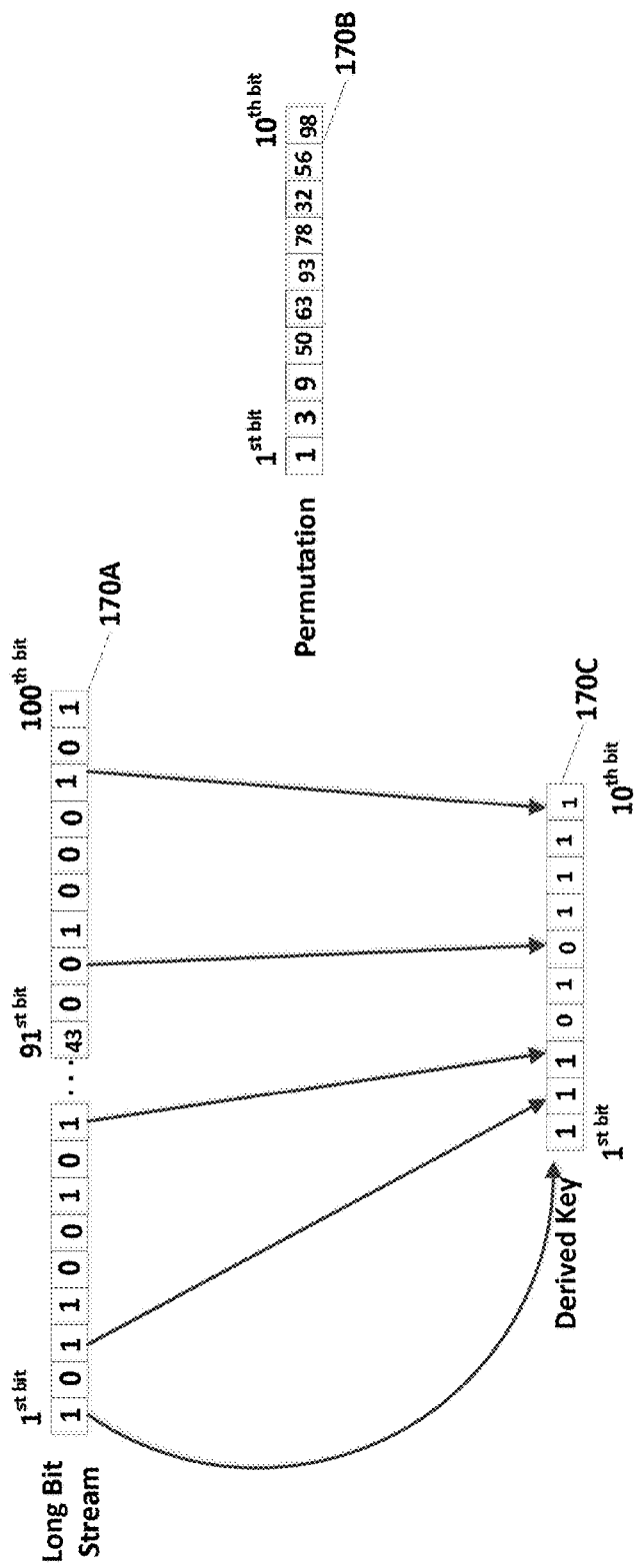
FIG. 1A depicts an example of a key derived using a permutation and a long bit stream associated with a given client, in accordance with some example implementations.

Cryptographic techniques often work in an all or nothing manner. For example, if an encryption key is available, the data can be decrypted into plaintext to allow processing of the plaintext data set. However, if the encryption key is not available, the data cannot be decrypted to allow processing of the plaintext dataset. With enterprise applications being configured to provide multi-tenant cloud services, separate keys for each tenant of a cloud (e.g., each user, client, and/or the like) may provide security among keys by virtue of the separate keys. However even with separate keys for each tenant, access to data is still an all or nothing proposition as noted above.

In real world applications, there can be numerous situations in which access to only a portion of a tenant's data is needed for processing. For example, a user executing a query may only be authorized to access a portion of the tenant's data but not other portions of the data. To illustrate further, a user at tenant X may generate a report by at least executing a single query that requires data from tenants Y, Z, U, R, S, T, and so forth. In this example, tenant X may represent a parent company having subsidiary companies or partners Y, Z, U, R, S, and T. The user at tenant X should be able to access only certain portions of data from the tenants Y, Z, U, R, S, and T, but should not have access to other portions of data from the tenants Y, Z, U, R, S, and T (e.g., due to data regulations, privacy, and/or the like). If each tenant has a different key, the user at tenant X may need encryption keys for each of the tenants Y, Z, U, R, S, and T, but this may as noted compromise unauthorized access to other portions of data from tenants Y, Z, U, R, S, and T. In some example implementations, there is provided a way to allow access to certain portions of data in a multi-tenant system, while providing privacy or security to other portions of data.

In some implementations, a long stream of bits is assigned to a user, such as a client at tenant X, for example. From the assigned long stream of bits, one or more keys for encryption can be derived (for example, by selecting subsets, such as portions, of the bits in the long stream of bits). In a system operating using AES 256 as the encryption algorithm, the client at tenant X may be assigned a long stream of bits such as 4096 bits for example. From this long stream of bits, one or more keys may be derived in order to encrypt or decrypt data or perform other operations. These one or more keys may be referred to as derived keys.

In some implementations, the size of the long stream of bits (hereinafter the long bit stream) may be determined for a given client. For example, when the client-user initially accesses (e.g., bootstraps and/or the like) the cloud-based system, the user may opt in to the privacy including encryption provided by the system. When this is the case, the length, or size, of the long bit stream may be determined. The size of the long bit stream (from which keys are derived)

may depend on a variety of factors including the number of data elements in the database, expected operations on those data elements, redundancy, and/or other factors. Based on these and other factors, the length of the long bit stream is determined, and the long bit stream may then be stored for use to derive encryption keys and/or decryption keys (also referred to herein as keys) for the client-user at a given tenant. For example, if the client-user is expected to perform an operation requiring access to ten data elements at a database application, when the user opts in, the size for the long bit stream may be sized as 2560 (e.g., 10×256 bits assuming AES 256) to allow the client-user to perform that operation, although other sizes may be implemented as well.

Given a long bit stream, one or more keys may be derived as noted above. In some example implementations, a permutation is generated that defines how to derive the key from the long bit stream. The permutation represents a function defining how to derive the key from the long bit stream. Specifically, the permutation may define which bits in the long bit stream are to be selected for the derived key. In some example implementations, the permutation is randomly, or pseudo-randomly, generated. Referring to the previous example of a long bit stream of 2560 bits and a 256 bit derived key, for a given client-user, a permutation may be generated of length 256 that defines which 256 bits from the long bit stream will be selected from the long bit stream (also referred to herein as a long key) to form the derived key.

FIG. 1A depicts a simplified example of a long bit stream 170A which in this example comprises 100 bits, a permutation 170B which defines the locations in the long bit stream 170A where the bits should be selected for the derived key 170C. As shown, the values of the key 170C are derived from the long bit stream 170A based on the location information in the permutation 170B. In this example, the permutation 170B has a length of 10 to match the length of the key 170C. It is the key 170C that is used to encrypt or decrypt data or operations associated with a given client-user, which is also associated with the long bit stream 170A. In this example, 10 keys may be derived from the long bit stream 170A. To derive 10 keys for example, 10 different permutations may be generated, and each of the permutations define which values in the long bit stream to select. In essence, each permutation provides a function (or mapping) between a client-user's long bit stream and the corresponding derived key used to encrypt/decrypt a data element and/or operation.

In some implementations, the long bit stream and the corresponding permutations may be uniquely generated for each tenant and/or a client-user at the tenant. Moreover, the corresponding permutations may be uniquely generated for each data element and/or operation. For each client-user for example, each data element may have a corresponding permutation defining the key to encrypt or decrypt the corresponding data element. In some implementations, the permutations may be stored securely, such as in an encrypted format in a secure or trusted storage.

Table 1 below depicts an example of a generator used to generate the long bit stream. To illustrate, suppose there are ten different elements in a cloud-based application to be encrypted, and suppose there are two pre-defined operations related to specific reports to be generated. When a user opts in to encryption, a generator creates the long bit stream, which is assigned to the client-user opting in to the encryption for the operation(s) and/or data element(s). In the example of Table 1, when the generator is called, it creates a long bit stream of a fixed size, such as 4096 bits for example, and returns that long bit stream to the caller.

TABLE 1

Long bit stream generator configured for random long bit stream generation.

```
// system defined // stored in a global registry of values
long keySize = 4096;
// generate a random sequence of bits for the user
BitArray key = create new BitArray(keySize) ;
For I from 0 to keySize − 1 do
    key.put(i , generateBinaryDigitRandomly( ));
// keygen algorithm //
// generate a randomBinaryDigit
def generateBinaryDigitRandomly function
long randomNumber = use system util to generate a random number
if randomNumber mod 2 == 0
    return 1;
Else
    return 0;
// random bit generation algorithm //
```

Although Table 1 below depicts an example long bit stream generator, the long bit stream may generated in other ways as well.

Table 2 below depicts an example implementation of the permutation generator. The permutation generator creates a permutation. As noted, the permutation is used to identify what bits in the long bit stream are mapped to a derived key. To generate the unique permutations for the 10 different data elements for the current example, 10 different permutations may be generated in accordance with Table 2, and these 10 permutations can then be used to derive the keys as note above.

Referring to Table 2, to generate the permutations, an array of size "keySize" can be created, and the elements of the array are populated with the corresponding indexes (e.g., 0 to the key size-1). The permutation generator at Table 2 may then be executed on this array. Suppose a key size of 256 bits (which corresponds to a derived key of 256 bits), the permutation generator may store the first 256 values as the 256-bit permutation. This permutation maps and defines how to form (e.g., or derive) the key from the long bit stream. Moreover, if 10 keys are to be derived for example, then the permutation generator of Table 1 may be run 10 times to generate 10 permutations.

TABLE 2

Permutation generation

```
// To generate a permutation from an array a of n elements (indices 0..n−1)
for i from n − 1 down to 1 do
    j = random integer with 0 <= j <= i
    exchange a[j] and a[i]
```

To provide randomness (e.g., substantially random with uniform probability in all positions of the permutation), the algorithm at Table 2 may be run on the size of long bit stream (e.g., wherein n is the length of the long bit stream), and then only the first n locations (wherein n is the key size) are taken as the permutation.

Figure 1B:
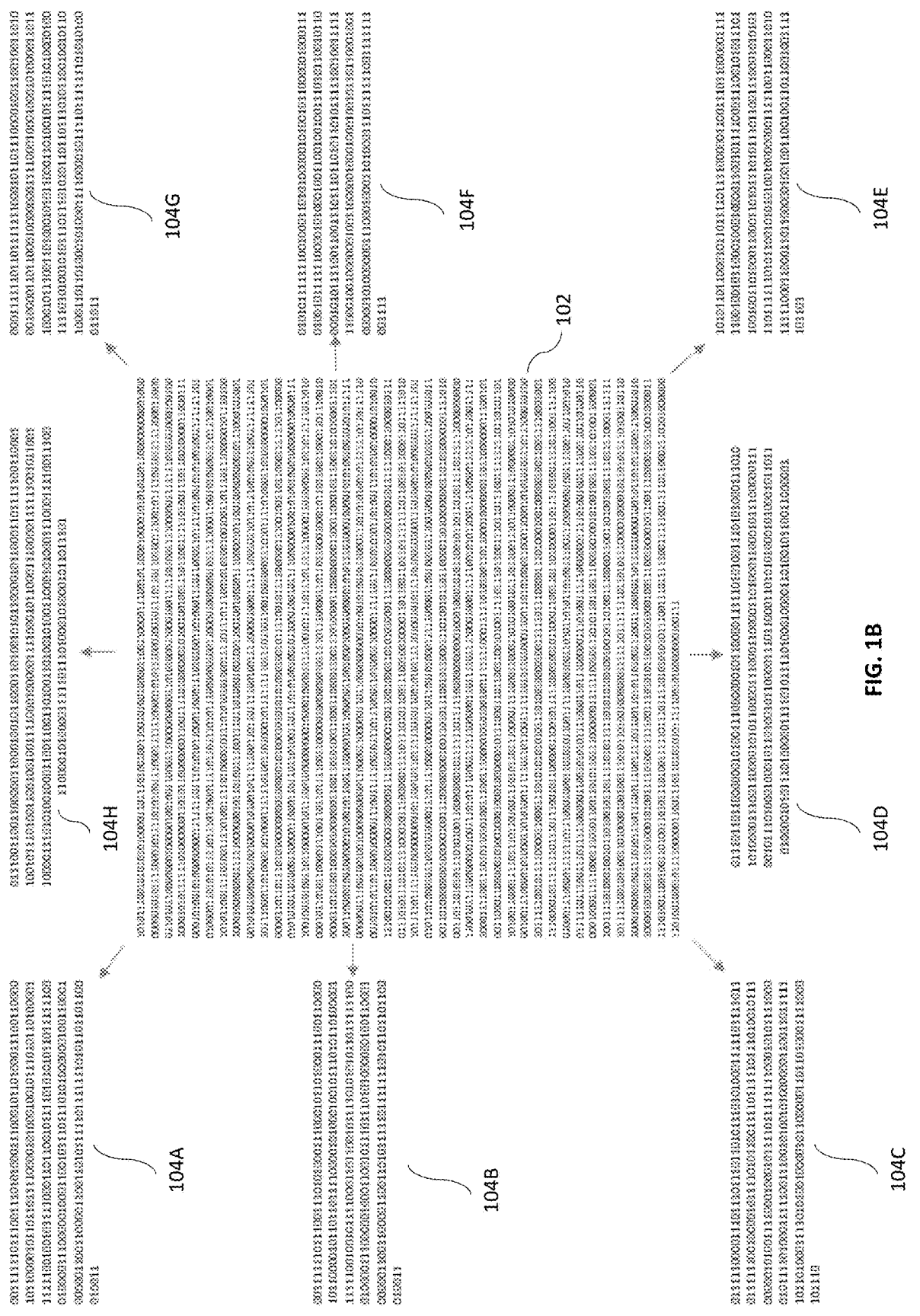

FIG. 1B depicts an example of a long bit stream 102 assigned to a user, and derived keys 104A-H formed from the permutations generated by a permutation generator as described above with respect to Table 2. In the example of FIG. 1B, the derived keys 104A-H may each be used to serve as a key to encrypt or decrypt 10 data elements (or an operation) at a database for example.

Figure 2:
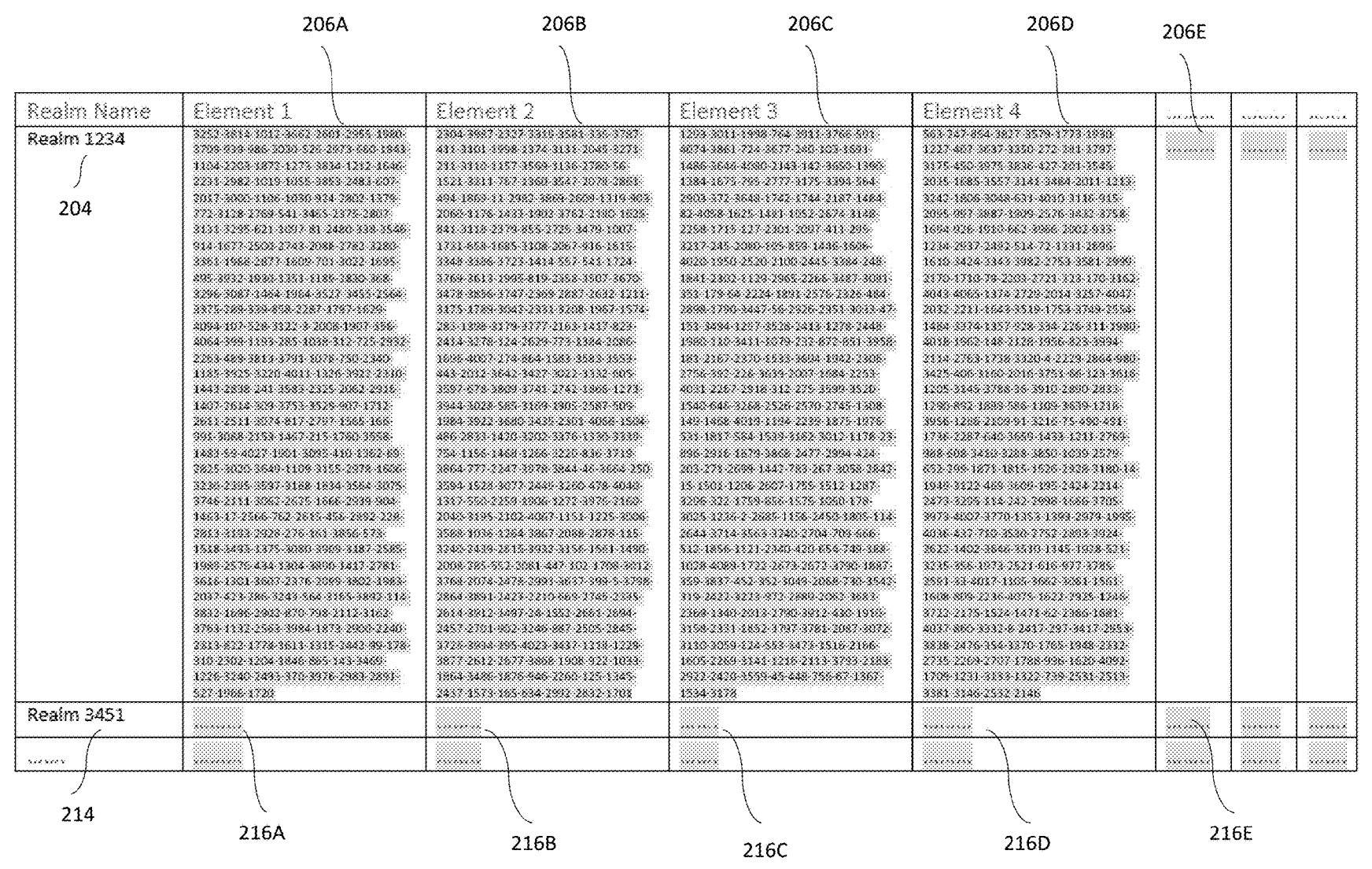

FIG. 2 shows that for a given client-user 204 (labeled realm 1234), each of the permutations 206A-E formed by the permutation generator are associated with a corresponding data element 1-4 and so forth that the client-user has opted into accessing securely. For example, for user 204 having a given long bit stream and attempting to access for example data element 1, the permutation 206A may be retrieved and then used to derive the key to encrypt or decrypt data element 1. In some implementations, the long bit stream and permutations are associated with a given user, such as user 204, to provide privacy and/or security. Likewise, for user 214 having a given long bit stream and attempting to access for example data element 1, the permutation 216A may be retrieved and then used to derive the key to encrypt or decrypt data element 1.

Figure 3:
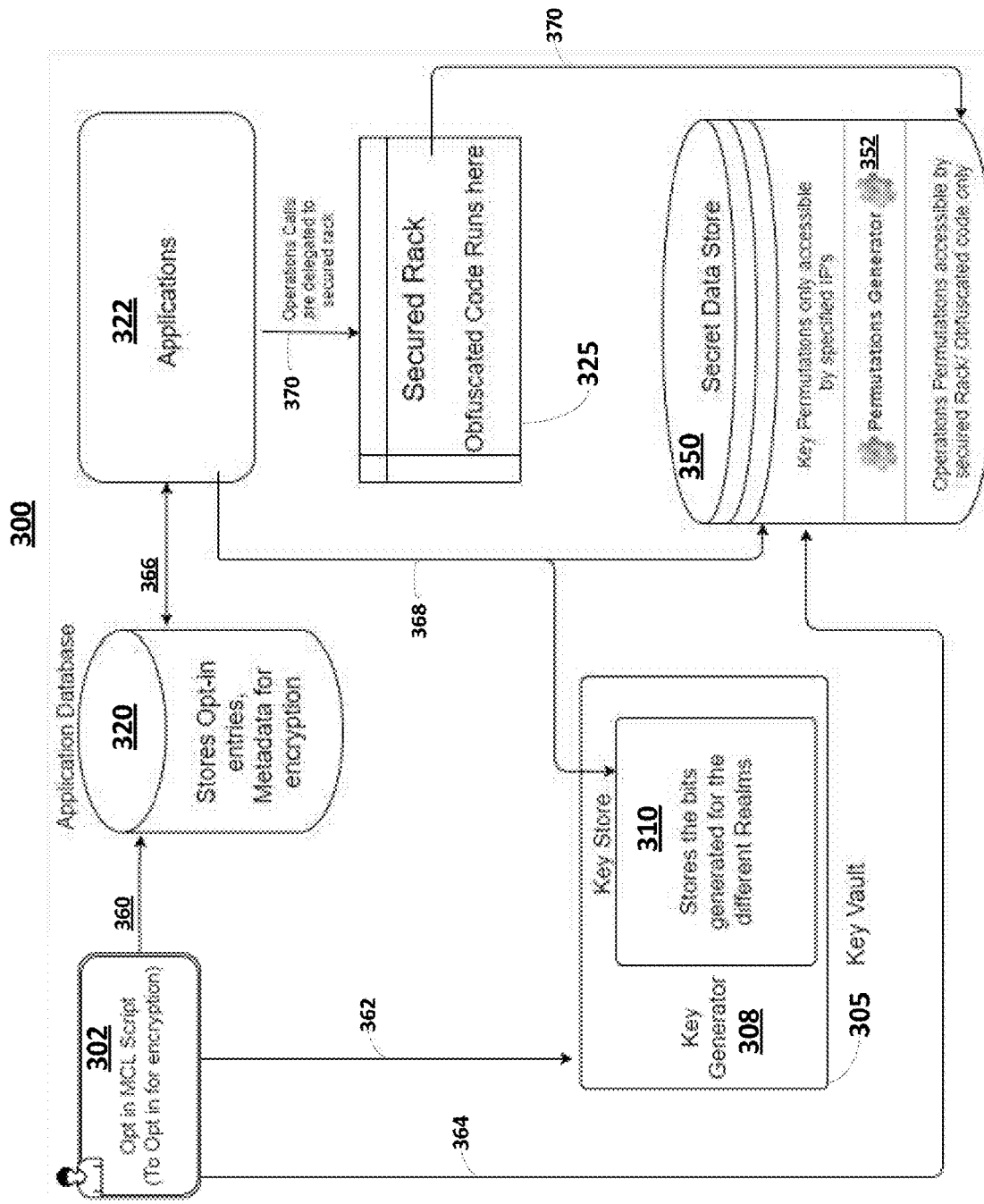
FIG. 3 illustrates a block diagram of a system, in accordance with some example implementations.

FIG. 3 depicts an example system 300, in accordance with some example implementations.

The system 300 may include a client-user 302 (which may include code such as script for opting into the security provided by system 300). The system 300 may also include a key vault 305 including a key generator 308 for generating long bit streams for each user, and a key store 310 for storing the long bit stream and an identity of the client-user assigned to the long bit stream. The system 300 may also include a data store 350 (labeled secure data store). The data store 350 may be a trusted storage device, and may include the permutation generator for generating permutations. Moreover, the data store 350 may securely store the permutations (e.g., which may be encrypted for added security).

In some implementations, access to the secure rack 325 is restricted with physical security. Moreover, the access to the secure rack 325 may require access via a secured protocol and/or certificate for accessing and executing operations on the secure rack. Moreover, the secure rack may include a protocol to change keys from time to time such as daily, weekly, or monthly. Moreover, access points for executing functions on the secure rack may require authentication using a master key and a key of the corresponding client-user. The master key may be another key used to secure access to the system. Furthermore, a plurality of secure racks may be networked on the same IP subnet and access to the secure racks may be controlled from a specific range of internal IP addresses.

The secured data store 350 may be implemented as a separate tiered system. Moreover, any data on the secure data store 350 (e.g., the permutations) may be secured with an additional layer of encryption. For example, an additional layer of encryption may be used to secure the permutations by encrypting a client-user's permutation(s) with a master key. This master key may be another key used to secure data. Furthermore, the master key may have a well-defined rotation policy. At rotation, the data encrypted using the old master key may be decrypted, re-encrypted using a new master key, and then stored again. In addition, the data store 325 may be accessed only via specified IP addresses under a specific sub-net behind a firewall (which may disable any external or unauthorized access).

At 360, a client-user 302 may call an application, such as application database 320, to opt in to the privacy and security provided by system 300. For example, the client-user 302 may opt in to specific data elements to secure via encryption. Moreover, the client-user may also opt in to access to a given report using the encrypted data elements.

When the client-user 302 opts in, a call is also made at 362 to the key vault 305 including key generator 308 and a key store 310. The call triggers the key generator to generate a long bit stream, which may be in accordance with Table 1 above, although other types of generators may be used to generate the long bit stream. Based on the opt-in by the client-user 302, the system may decide the length of the long bit stream for the client-user. The generated long bit stream may be stored at key store 310 and mapped to the client-user 302. The long bit stream may also be passed back to client-user 302 as well as other components of system 300. For security, the system may ensure the key store is secure (e.g., e.g., in accordance with a standard such as Federal Information Processing Standards (FIPS) compliant). Moreover, the system may ensure the long bit stream is itself secured using, for example, a password such as a master password. A master password is a password, and the master password may be a password for use by administrators, developers, and/or other entities to enable development and/or maintenance of the system. Moreover, the long bit stream may be secured before being passed between components via the network.

The client-user 302 may call, at 364, a data store, such as secret data store 350. The secret data store may include the permutations generator 352, which creates and stores permutations specifically for the corresponding client-user 302 and corresponding operations and data elements. The generation of the permutations may be in accordance with Table 2, although other types of permutations generators may be used as well. The generated permutations for the client-user 302 may, as noted, be stored in the data store 350 along with an identifier for client-user 302 and/or identifiers for the data elements and/or operations.

When the permutations are generated for the client-user 302, the data store 350 may send an acknowledgement message to client-user 302 to indicate that the opt in is complete for the client-user 302. Referring again to the example above in which 10 permutations are generated, when the permutation generator creates the 10 permutations and then stores them in the data store 350 (along with the corresponding identifier indicating the client-user and/or the corresponding identifier of the data elements or operations), the opt in may be considered complete. At this point, the data elements/operations may be encrypted or decrypted using keys derived from the long bit stream and the permutations. These encrypted elements may then be stored awaiting access by client-user 302.

In some implementations, access to data store 350 is restricted to devices at certain addresses, such as IP addresses.

After opt in is completed, the client-user 302 may then access application 322 by for example logging in to the application 322. When the client-user logs in to generate a report such as the 10 data element report in the prior example, the application 322 may access, at 366, a storage medium (e.g., application database 320 or a local cache at application 322) to obtain information such as metadata regarding whether client-user 302 has opted-in for secure access to an operation such as the report generation operation having 10 data elements, each of which have been encrypted using keys derived from the long bit stream and the permutations.

At 368, if the application 322 does not already have in its local cache the client-user's 302 long bit stream, the client-user 302 may obtain from the key vault 305/key store 310 the long bit stream for the client-user 302.

The application 322 may, at 368, send to the data store 350 the long bit stream, the identity of the 10 elements to be decrypted for the report generation operation, and/or the identity of the client-user 302. The data store 350 may then derive the 10 keys for the 10 data elements by using the long bit stream and the permutations, which may be stored securely at data store 350 and may define how to form the keys from the long bit stream. The data store 350 may then provide the decrypted 10 data elements to the secured rack 325.

At the secured rack 325, the call at 370 for the operation (which in this example is a report including 10 data elements) can be handled by generating the report for example using the 10 decrypted data elements, and the secure rack may then return that report to the caller, such as application 322.

In some implementations, the client-user 302 may need an operation that requires a computation on encrypted data elements or values. When this is the case, the client-user 302 may opt in for the function at application database 320. As noted above, a long bit stream may generated and stored in the key vault 305/key store 310 and permutations may be generated and stored at 350 for the client-user 302. When the client-user 302 access the application 322 in order to perform the opted in function/operation that requires computation on encrypted values, the application 322 may obtain the long bit stream associated with the function and the client-user 302 by accessing key vault 305/key store 310. The application 322 may also obtain an "operations" permutation for the long bit stream from data store 350. The operation permutation may be used to secure a concatenated key that is used to perform an operation. The concatenated key may comprise a concatenation of keys, such as all of the derived keys needed to perform an operation. The operation permutation may provide an additional level of security for the derived key of the data elements (which may be used or access during the operation).

In some implementations, the keys required for data access and/or for an operation (e.g., report generation or other type of function, computation, or operation) may be computed using the permutations disclosed herein, and the keys may be concatenated. The concatenated key may then be scrambled using the operations permutation for the client-user. For example, given a concatenated key, the operation permutation may define the scrambling (or ordering of bits). Table 3 below depicts the concatenated key, the operation permutation, and the scrambling concatenated key. The unscrambling would be the inverse using the operation permutation.

TABLE 3

| | Concatenated Key | | | | | | | | | |
|---|---|---|---|---|---|---|---|---|---|---|
| | 1 | 0 | 1 | 0 | 0 | 0 | 1 | 1 | 1 | 0 |
| Operations Permutation | 8 | 6 | 4 | 2 | 3 | 7 | 1 | 5 | 9 | 0 |
| Concatenated Key | 1 | 1 | 0 | 1 | 0 | 1 | 0 | 0 | 0 | 1 |

For the same operation, each client-user may have a separate operations permutation for scrambling and unscrambling the concatenated keys passed to the operation function on the secured rack 325. The application 322 may then call code on the secured rack 325, and the application 322 may pass the scrambled bits of the long bit stream to the secured rack. The secured rack can then unscramble the long bit stream keys and execute the operation.

In some implementations, one or more additional techniques may be used to provide enhanced security to attacks. For example, for each operation that can be performed at a cloud-based application such as application 322, a unique permutation of the size of the concatenated key (of all data elements for the operation) may be generated and stored in the key vault 305. This unique permutation may be used to scramble and unscramble the key, when passed to the operation. Alternatively or additionally, the code for the operation (e.g., the code for executing the operation) may also be obfuscated by scrambling and stored at 325. This scrambling may provide an additional level of security.

Table 4 depicts an example interface for executing an operation. In the example, the defined interface takes two parameters. The first parameter is an array comprising the stream of the data elements to be processed by the operation, and the second parameter is the key (which may be scrambled as well) for all the data elements passed as a BitArray.

TABLE 4

Interface Operation {
　　Result performOperation (Array < Stream <Data> >, BitArray)
}

When a new operation is initially formed or defined, the operation may be analyzed to determine how many encrypted elements are required to perform the operation, and the analysis may include defining system metrics for the operation. A bootstrap tool may be used to generate, based on the number of elements used in the operation, a permutation for scrambling the key. To illustrate, suppose the operation needs access to 4 different data elements belonging only to a single tenant. The BitArray passed to the operation function will have a size of 1024 (which assumes 256 bit keys, so that 256×4=1024). The bootstrap tool may make the entries shown in Table 4 in the data store. The entries in italics are stored in encrypted format using a master key of the application. In some implementations, the master key may be another key used to secure data of the store secret data store 350. This may be an enterprise application level master key. Furthermore, the master key may have a very well defined rotation policy. At rotation, the data encrypted using the old master key may, as noted above, be decrypted, re-encrypted using the new master key, and then stored again.

TABLE 5

| Function Id | Number of Data elements to be processed |
|---|---|
| Quarterly Sales Report | *4* |
| Annual Sales Report | *17* |
| Sales Forecast Report | *43* |

For each client-user or tenant subscribing to the operation, the system 300 may generate a unique permutation of the size of the BitArray (containing the keys data) that will be passed to the operation for processing. For example, if a client-user (e.g., realm id 173 at Table 7) opts in for an operation that generates the "Quarterly Sales Report," the cloud-based system 300 may generate a unique permutation of size 1024 (using for example the process at Table 6) for the operation and may then store the unique permutation in a data store as shown in Table 7 below. The generated permutation may also be stored in an encrypted format for additional security.

TABLE 6

Algorithm for generating the permutation of
the key for operating on the data elements.

```
create an array 'a' of size 1024      // size as defined above
for i from 0 up to n − 1 do
    a[i] = i
for i from n − 1 down to 1 do
    j = random integer with 0 <= j <= i
    exchange a[j] and a[i]
```

TABLE 7

Data Store to store the permutation of the operation
key. Entries in italics are stored in encrypted format
using the master key of the application.

| Function Id | Realm Id | Permutation of key bits |
| --- | --- | --- |
| Quarterly Sales Report | 173 | *[9, 14, 1, 67, 282, 894, 1011, 883, . . .]* |
| Quarterly Sales Report | 181 | *[24, 63, 431, 679, 23, 899, 1001, . . .]* |

To recapitulate, a user may want to execute a query in order to generate a report, such as "Quarterly Sales Report." When this is the case, the tenant 302 logs into the cloud-based system 300. The session for the tenant is created and the long bit stream is loaded from the key vault 305. For each data element, the corresponding algorithm is executed in a secured container 325. The permutation for the key of the data element is loaded, and then the permutation can be decrypted using the master key. The permutations are executed on the BitArray of the long bit stream, and the keys for each data element are created. If an operation is subscribed for execution, the keys of the various data elements required for the operation are loaded and concatenated to form a so-called cumulative key. The loaded key may be processed by a permutation (which may generated for the operation) and may be scrambled for additional security. The scrambled, concatenated key is allowed to be accessed only by users authorized for performing the operation. The permutation is loaded only in a secured container 350 and unloaded after that. The permutated code may be loaded again during the obfuscated operation code, which is also executed in a secured container 350. During the execution of the operation, the scrambled key may be unscrambled using the permutation of the operation. Once unscrambled, the individual keys for the data elements required for performing the operations are available in the context of the execution of the operation and are used to perform the operation and return the results to the user.

Although some of the examples refer to a certain key size (e.g., 256 bits) and AES 256 encryption, these are only examples as other key sizes and encryption technology may be used as well.

Figure 4:
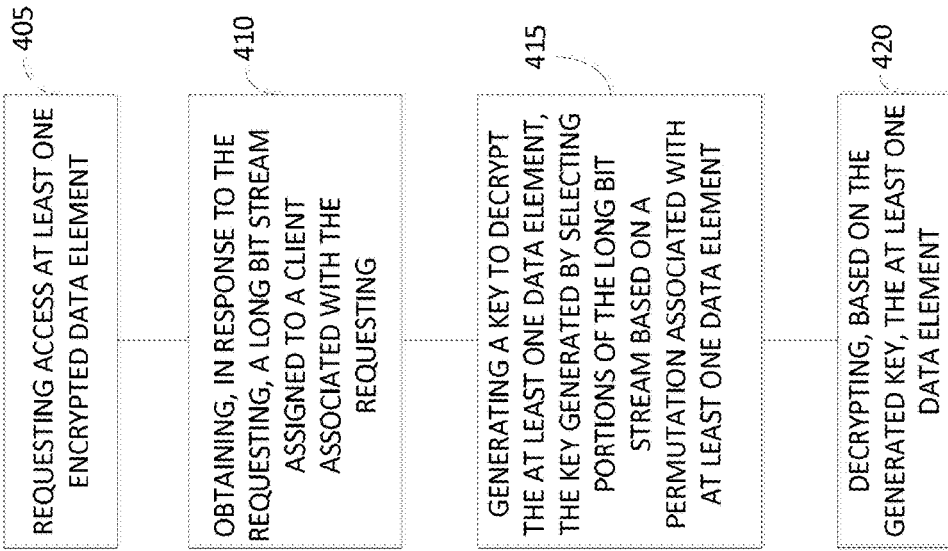
FIG. 4 depicts an example of process for securing data, in accordance with some example implementations.

FIG. 4 depicts an example of a process for securing data, in accordance with some example embodiments.

At 405, access may be requested to at least one encrypted data element. For example, a client-user 302 may access an application and require access to a data element, such as a row or column of a database. This data element may be needed to perform a high-level operation, such as generate a report.

In response to the request at 405, a long bit stream may be obtained, and this long bit stream may be assigned to the client-user associated with the requested data element. For example, client-user may be assigned a certain long bit streaming (which may also be associated with the data element).

At 415, a key to decrypt the at least one data element may be generated. For example, the key may be generated based on a permutation defining which portions of the long bit stream are to be selected for use in the key. The generated key may then be used at 420 to decrypt the at least one data element.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. For example, the client user may be implemented as a user interface and/or application executed on a processor, such as a computer, tablet, cellular phone, IoT device, and/or the like. Although a few variations have been described in detail above, other modifications or additions are possible. In particular, further features and/or variations can be provided in addition to those set forth herein. For example, the implementations described above can be directed to various combinations and sub combinations of the disclosed features and/or combinations and sub combinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed:

1. A method comprising:
   receiving a request from a client for access to at least a first encrypted data element and a second encrypted data element of a database including a plurality of data elements, the first encrypted data element having a first identity, the second encrypted data element having a second identity, and the client being associated with a client identifier;
   assigning a long bit stream to the client associated with at least one of the first encrypted data element and the second encrypted data element;
   obtaining a first permutation associated with the first encrypted data element of the database;
   obtaining a second permutation associated with the second encrypted data element of the database, wherein the first and second permutations being secured using a rotatable master key generated in accordance with a master key rotation policy;
   deriving, based on the long bit stream and the first permutation, a first key to decrypt the first encrypted data element of the database, the first key derived by selecting, based on the first permutation, portions of the long bit stream to form the first key, the first permutation indicating which portions of the long bit stream to select;
   deriving, based on the long bit stream and the second permutation, a second key to decrypt the second encrypted data element of the database, the second key derived by selecting, based on the second permutation, portions of the long bit stream to form the second key, the second permutation indicating which portions of the long bit stream to select, the first and second keys being scrambled;
   decrypting, based on the first key, the first encrypted data element to provide a first data element;
   decrypting, based on the second key, the second encrypted data element to provide a second data element; and
   returning a response to the request, the response including the first data element and the second data element.

2. The method of claim 1, wherein the first permutation comprises a first function defining the mapping between the long bit stream and the first key used to decrypt the first encrypted data element, and wherein the second permutation comprises a second function defining the mapping between the long bit stream and the second key used to decrypt the second encrypted data element.

3. The method of claim 2, wherein the first function identifies which bits in the long bit stream are selected for the first key, wherein the second function identifies which bits in the long bit stream are selected for the second key.

4. The method of claim 2, wherein the first permutation is associated to the first encrypted data element by a first mapping to the client and the first encrypted data element, and second permutation is associated to the second encrypted data element by a second mapping to the client and the second encrypted data element, and wherein the first and second permutations are each generated randomly.

5. The method of claim 1, wherein the first permutation is stored in a secure storage including a permutation generator configured to generate the first permutation and the second permutation, and wherein the secure storage is separate from another storage containing the long bit stream mapped to the client.

6. The method of claim 1, wherein the first data element is stored in the database, the database comprising a column-store database.

7. An apparatus comprising:
   at least one processor; and
   at least one memory including program code which when executed by the at least one processor causes operations comprising:
      receiving a request from a client for access to at least a first encrypted data element and a second encrypted data element of a database including a plurality of data elements, the first encrypted data element having a first identity, the second encrypted data element having a second identity, and the client being associated with a client identifier;
      assigning a long bit stream to the client associated with at least one of the first encrypted data element and the second encrypted data element;
      obtaining a first permutation associated with the first encrypted data element of the database;
      obtaining a second permutation associated with the second encrypted data element of the database, wherein the first and second permutations being secured using a rotatable master key generated in accordance with a master key rotation policy;
      deriving, based on the long bit stream and the first permutation, a first key to decrypt the first encrypted data element of the database, the first key derived by selecting, based on the first permutation, portions of the long bit stream to form the first key, the first permutation indicating which portions of the long bit stream to select;
      deriving, based on the long bit stream and the second permutation, a second key to decrypt the second encrypted data element of the database, the second key derived by selecting, based on the second permutation, portions of the long bit stream to form the second key, the second permutation indicating which portions of the long bit stream to select, the first and second keys being scrambled;
      decrypting, based on the first key, the first encrypted data element to provide a first data element;

decrypting, based on the second key, the second encrypted data element to provide a second data element; and returning a response to the request, the response including the first data element and the second data element.

8. The apparatus of claim 7, wherein the first permutation comprises a first function defining the mapping between the long bit stream and the first key used to decrypt the first encrypted data element, and wherein the second permutation comprises a second function defining the mapping between the long bit stream and the second key used to decrypt the second encrypted data element.

9. The apparatus of claim 8, wherein the first function identifies which bits in the long bit stream are selected for the first key, wherein the second function identifies which bits in the long bit stream are selected for the second key.

10. The apparatus of claim 8, wherein the first permutation is associated to the first encrypted data element by a first mapping to the client and the first encrypted data element, and second permutation is associated to the second encrypted data element by a second mapping to the client and the second encrypted data element, and wherein the first and second permutations are each generated randomly.

11. The apparatus of claim 7, wherein the permutation is stored in a secure storage including a permutation generator configured to generate the first permutation and the second permutation, and wherein the secure storage is separate from another storage containing the long bit stream mapped to the client.

12. The apparatus of claim 7, wherein the first data element is stored in the database, the database comprising a column-store database.

13. A non-transitory computer-readable storage medium including program code which when executed by at least one processor causes operations comprising:

receiving a request from a client for access to at least a first encrypted data element and a second encrypted data element of a database including a plurality of data elements, the first encrypted data element having a first identity, the second encrypted data element having a second identity, and the client being associated with a client identifier;

assigning a long bit stream to the client associated with at least one of the first encrypted data element and the second encrypted data element;

obtaining a first permutation associated with the first encrypted data element of the database;

obtaining a second permutation associated with the second encrypted data element of the database, wherein the first and second permutations being secured using a rotatable master key generated in accordance with a master key rotation policy;

deriving, based on the long bit stream and the first permutation, a first key to decrypt the first encrypted data element of the database, the first key derived by selecting, based on the first permutation, portions of the long bit stream to form the first key, the first permutation indicating which portions of the long bit stream to select;

deriving, based on the long bit stream and the second permutation, a second key to decrypt the second encrypted data element of the database, the second key derived by selecting, based on the second permutation, portions of the long bit stream to form the second key, the second permutation indicating which portions of the long bit stream to select, the first and second keys being scrambled;

decrypting, based on the first key, the first encrypted data element to provide a first data element;

decrypting, based on the second key, the second encrypted data element to provide a second data element; and returning a response to the request, the response including the first data element and the second data element.

14. The non-transitory computer-readable storage medium of claim 13, wherein the first permutation comprises a first function defining the mapping between the long bit stream and the first key used to decrypt the first encrypted data element, and wherein the second permutation comprises a second function defining the mapping between the long bit stream and the second key used to decrypt the second encrypted data element.

15. The non-transitory computer-readable storage medium of claim 14, wherein the first function identifies which bits in the long bit stream are selected for the first key, wherein the second function identifies which bits in the long bit stream are selected for the second key.

16. The non-transitory computer-readable storage medium of claim 14, wherein the first permutation is associated to the first encrypted data element by a first mapping to the client and the first encrypted data element, and second permutation is associated to the second encrypted data element by a second mapping to the client and the second encrypted data element, and wherein the first and second permutations are each generated randomly.

17. The non-transitory computer-readable storage medium of claim 13, wherein the first data element is stored in the database, the database comprising a column-store database.

* * * * *